United States Patent [19]

McNair

[11] 4,321,557

[45] Mar. 23, 1982

[54] LASER GYRO COUPLING SYSTEM

[75] Inventor: Fred McNair, Woodland Hills, Calif.

[73] Assignee: Litton Systems, Inc., Beverly Hills, Calif.

[21] Appl. No.: 113,901

[22] Filed: Jan. 21, 1980

[51] Int. Cl.³ .............................................. H01S 3/02
[52] U.S. Cl. ....................................... 372/33; 356/350
[58] Field of Search ..................... 331/94.5 C, 94.5 D; 356/350; 74/5 R

[56] References Cited
U.S. PATENT DOCUMENTS 4,085,825 4/1978 Scarborough ...................... 356/350

Primary Examiner—William L. Sikes
Attorney, Agent, or Firm—Roy L. Brown

[57] ABSTRACT

This invention relates to a laser gyro coupling system which utilizes a pair of resilient rings located between a plate attached to the laser dither suspension mechanism and the lower surface of a ring laser to form a reservoir for a viscous fluid. The coupling system permits the dither suspension mechanism to drive the ring laser at its dither frequency without transmitting stresses to the ring laser due to thermal expansion.

7 Claims, 2 Drawing Figures

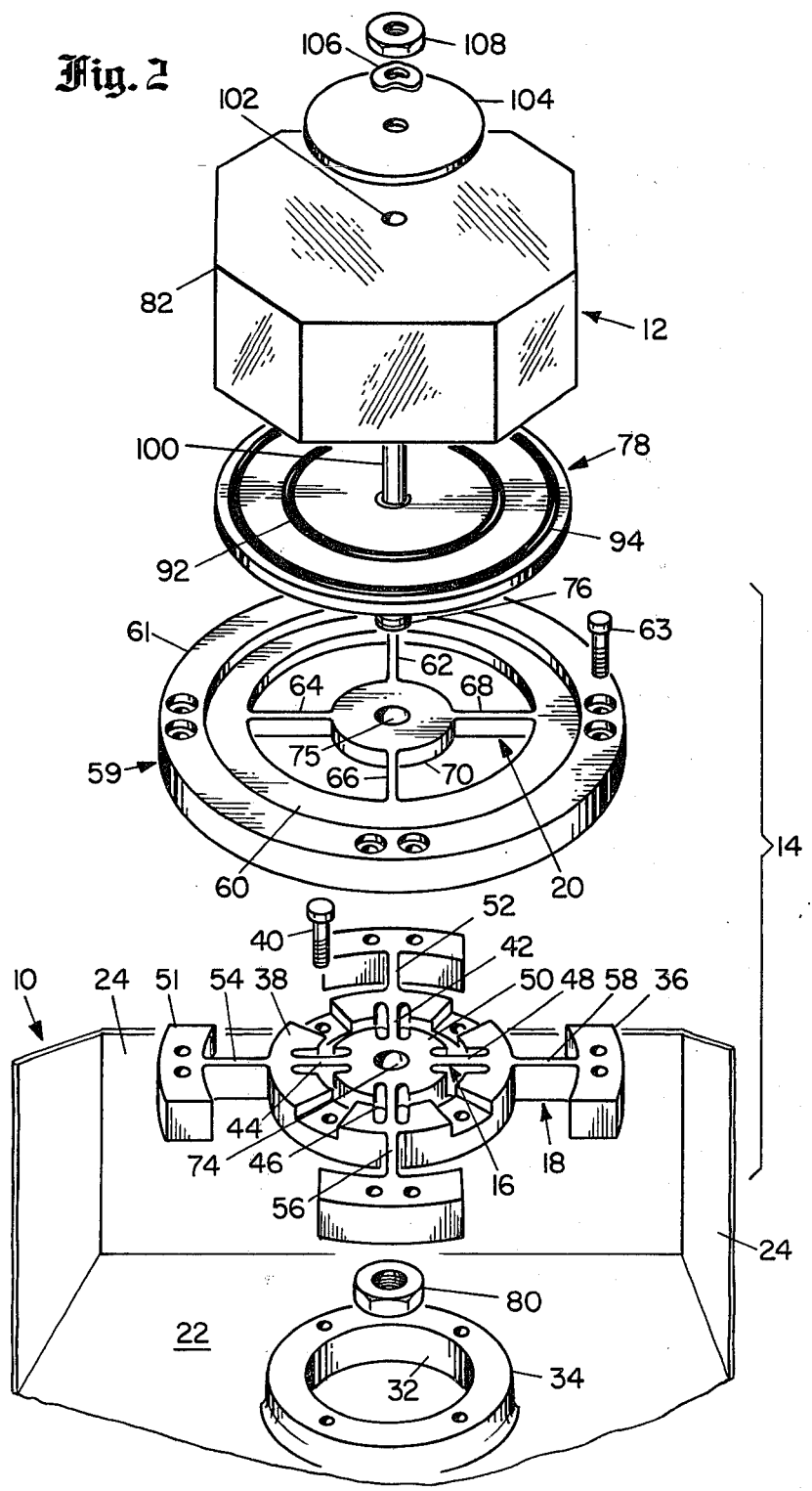

LASER GYRO COUPLING SYSTEM

FIELD OF THE INVENTION

This invention relates to a coupling system and, more particularly, to an improved coupling system for use in a laser gyroscope which is arranged to reject low frequency motion such as that created by the contraction or expansion of various gyro components due to temperature changes within the gyro while transmitting high frequency motion such as that generated by the dither mechanism of the gyro.

BACKGROUND OF THE INVENTION

It is known in the prior art to mount the body in which a laser is formed to a dither suspension mechanism which, in turn, is attached to a case for housing the laser. In one prior art system, the laser body is attached to the dither suspension mechanism by a ring of bolts. Such an arrangement is shown in a copending patent application by McNair and Wirt entitled LASER GYRO DITHER MECHANISM which was filed on Jan. 11, 1980, assigned Ser. No. 06/111,154, with inventors Fred McNair and Thomas M. Wirt, and is assigned to Litton Systems Inc., the assignee of this patent application.

If a ring of bolts is not used, it is common in the art relating to laser technology to utilize an adhesive. However, the bonding of a metallic part, such as a top plate of a dither suspension mechanism, to a nonmetallic body such as a laser body, creates an inherent mismatch of the coefficients of thermal expansion as the ring laser gyro cycles through extreme temperature variations. The forces created by the mismatch of thermal expansion generate stresses within the laser body that cause the degradation of the laser output.

In most situations outside the laser art in which a coupler is required, it is common to use a coupler to isolate a device from vibrations generated within a mounting frame or to isolate a mounting frame upon which the device is mounted from vibrations generated by the device. In these arrangements it is generally desired to transmit low frequency forces, such as a load or a driving force, while isolating high frequency forces, such as those generated by vibration. An example of such a mounting arrangement for isolating high frequency energy while passing low frequency energy may be found in U.S. Pat. No. 2,582,363 by Thiry which issued on Jan. 15, 1952. This mounting arrangement utilizes an incompressible fluid, such as oil, to modify the mounting characteristics of a shock absorber while utilizing rubber as the means for carrying the load.

SUMMARY OF THE INVENTION.

The present invention utilizes a resilient device and a viscous fluid to provide a unique coupling arrangement in which high frequency motion is transmitted rather than absorbed between driving and driven members while low frequency motion is rejected rather than transmitted. The coupling is accomplished through the utilization of a pair of parallel plates arranged with surfaces which are parallel and closely spaced. Located between the closely spaced, parallel surfaces are a pair of resilient annular rings which in combination with the surfaces define a reservoir that retains a viscous fluid. At the dither frequency generated by a dither suspension mechanism of a laser gyro, the viscous fluid appears as a solid for transmitting the dither frequency from the suspension mechanism to the gyro. At low frequencies, caused by the dimensional change between the parallel surfaces of the two plates due to thermal expansion, the viscous fluid and the resilient rings reject the dimensional changes by not transmitting such changes therebetween.

Thus, it is the object of the present invention to provide an improved coupling system in which high frequency forces are easily transmitted while undesired, low frequency forces are rejected.

Another object of the invention is to provide an improved coupling system for a laser gyro in which high frequency dither vibration is transmitted from the dither suspension mechanism to the laser body while low frequency thermal expansion or contraction is rejected.

Yet another object of this invention is to provide a small, compact and economic coupling system which may be easily built into an existing ring laser gyro.

BRIEF DESCRIPTION OF THE DRAWINGS

FIG. 2 is an exploded view showing the ring laser gyro of FIG. 1.

DETAILED DESCRIPTION

Figure 1:
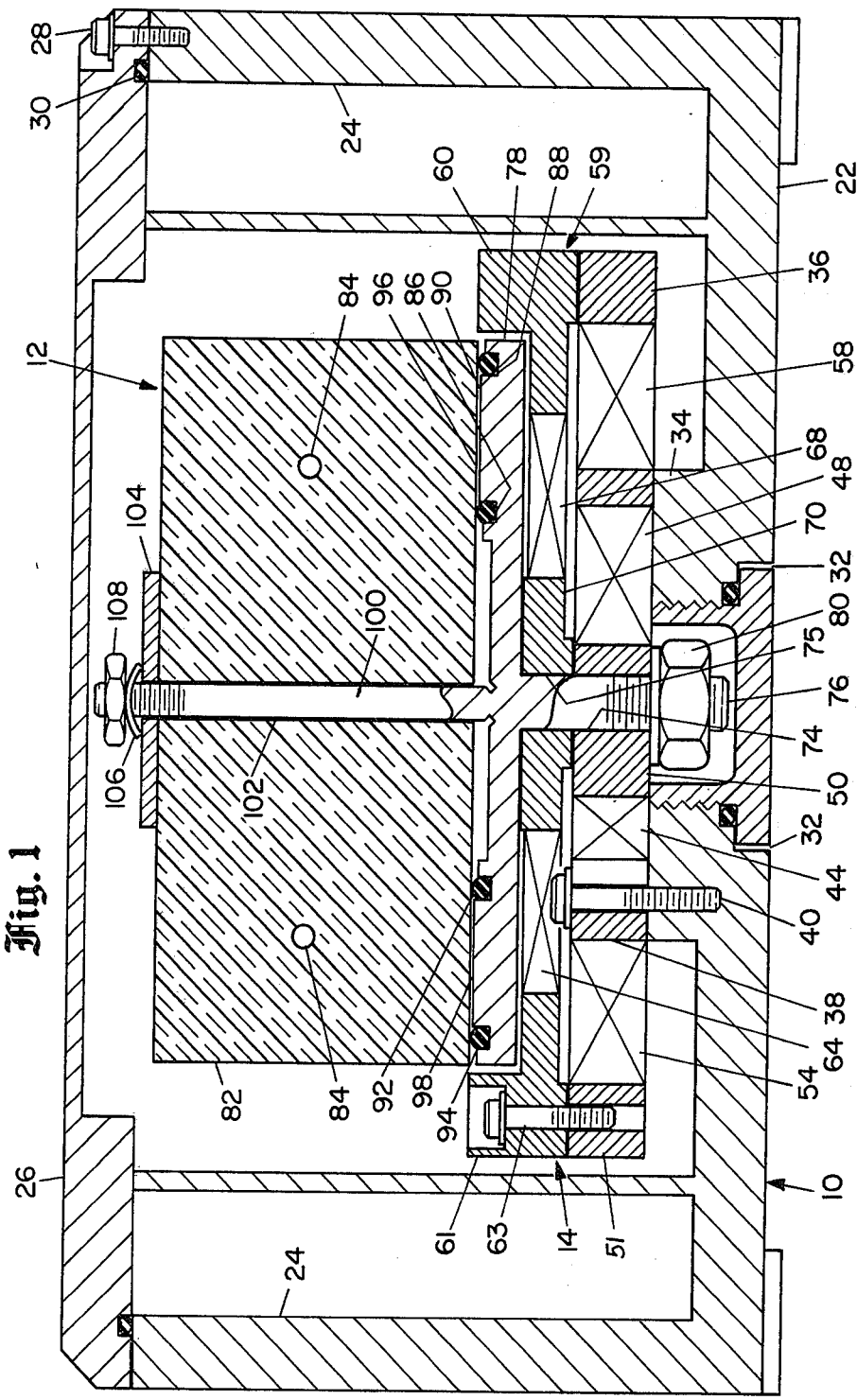
FIG. 1 is a side view, shown in cross-section, of a ring laser gyro incorporating the present invention.

Referring now to the drawings, FIG. 1 shows a ring laser gyroscope having a housing case 10 which mounts a laser 12 upon a dither suspension mechanism 14 formed by a three-spring suspension system including a first spring system 16, a second spring system 18 and a third spring system 20, best seen in FIG. 2.

The gyro case 10 is formed from a flat rectangularly-shaped base 22 having sidewalls 24 that form a cavity which is closed by a rectangular cover 26 secured to the sidewalls 24 by screws 28 and sealed thereon by O-ring 30. The rectangular base 22 is provided with an aperture 32 surrounded by a toroidally-shaped mounting collar 34. Mounted upon the collar 34 is first flexure plate 36 which incorporates the first and second spring system 16 and 18, respectively.

The flexure plate 36 consists of a first middle toroidal mounting ring 38 which is concentrically aligned with the case collar 34 and attached thereto by a plurality of screws 40; whereby, the middle ring 38 becomes part of the case 10. The first spring system 16 is comprised of four radially and inwardly directed webs 42, 44, 46, and 48 which attach the first middle toroidal ring 38 to an inner mounting hub 50 to which is mounted the laser 12. The first middle toroidal ring 38 is also attached to an outer toroidal ring 51 by the second spring system 18 formed from four webs 52, 54, 56, and 58 which radiate from the first toroidal ring 38 outwardly toward the outer, segmented toroidal ring 51. The outer toroidal ring 51 forms part of a counterweight 59 which will be described below.

Mounted upon the first flexure plate 36 is a second flexure plate 60 having an outer toroidal ring 61 which is concentrically aligned with the outer toroidal ring 51 of the first flexure plate 36. The outer toroidal ring 61 is connected via the third spring system 20 formed by radially and inwardly directed webs 62, 64, 66, end 68 to an inner hub 70 which is coaxially arranged with the inner hub 50 of the first flexure plate.

The outer toroidal ring 61 of the second flexure plate 60 forms the second mass of the counterweight 59. This ring 61 is attached to the outer toroidal ring 51 by a plurality of screws 63. Each flexure plate 36 and 60 has a centrally located aperture 74 and 75, respectively, through which passes a flexure stud 76 which extends from the lower surface of a gyro mounting platform 78. The lowermost end of the stud 76 is threaded to receive a hex nut 80 which, in combination with screws 63, unite the first and second flexure plates 36 and 60 into the dither suspension mechanism 14.

Mounted upon the gyro mounting plate 78 is the laser 12 formed within a body 82 that may be constructed from quartz or an ultralow expansion material, such as titianium silicate. The laser body 82 is formed with four passageways 84 arranged in a rectangular path. The passageways 84 are sealed to retain a gas mixture consisting of approximately 90% helium and 10% neon at a vacuum of approximately 3 torr, it being understood that atmospheric pressure is approximately 760 torrs.

The laser gyro coupling system is formed between the upper surface of the gyro mounting plate 78 and the lower surface of the laser body 82 with the upper surface of the gyro mounting plate 78 relieved by two annular concentric grooves 86 and 88 wherein the radius of groove 86 is less than the radius of groove 88. Between the annular grooves, the upper surface of the gyro mounting plate 78 has been raised to form a toroidally-shaped collar surface 90 parallel to and narrowly spaced from the lower surface of the laser body 82. Mounted within grooves 86 and 88 are annular rings of resilient material 92 and 94, respectively. These rings 92 and 94, shaped in an O-ring configuration, form the sides of a reservoir 96 wherein the lower surface of the reservoir is formed by the upper surface of the toroidally-shaped collar 90, and the upper surface is formed by the lower surface of laser body 82. The reservoir 96 is filled with a viscous fluid 98, such as silicon oil or silicon grease.

Extending from the center of the upper surface of the gyro mounting plate 78 along the major axis of the gyro is a flexure stud 100 which extends through a clearance hole 102 within the laser body 82 and which is considerably smaller in diameter than the stud 76. The uppermost end of the flexure stud 100 passes through a large diameter flat washer 104, made from a low coefficient of expansion steel known as invar, and then through a compression washer 106, such as a bellville washer. The end of the stud 100 is threaded to receive a hex nut 108 to complete the coupling assembly.

In the preferred embodiment, the ring gyro laser is driven by piezoelectric driving means attached to the wide, longitudinal surfaces of the second and third spring systems 18 and 20. By impressing a voltage across these piezoelectric devices, they are forced to contract or expand, in turn, causing the movement of the web and the gyro attached to the dithered suspension mechanism 14 by the coupling system.

As the dithered suspension mechanism rotates in a clockwise and then a counterclockwise direction about the major axis of the gyro, i.e. dithers, the viscous fluid 98 within the reservoir 96 appears as a solid within the narrow space between the upper surface of the toroidally-shaped collar 90 and the lower surface of the laser body 82 as the fluid has been chosen to have a relatively high viscosity for the given conditions. Due to the high viscosity of fluid 98, the high frequency dither motion from the suspension mechanism 14 is transmitted directly to the laser body 82. Yet, at lower frequencies, such as those caused by the thermal expansion between the laser body 82 and the gyro mounting plate 78, the coupling system created by the fluid 98 and the O-rings 92 and 94 yields to reject the changing forces caused by thermal expansion. As the gyro mounting plate 78 expands with respect to the laser body 82 in a direction perpendicular to the major axis of the gyro, the relative motion between plate 78 and body 82 is rejected by a rolling action of O-rings 92 and 94. Expansion in a direction parallel to the major axis of of the gyro by plate 78 toward or away from the body 82 causes the body 82 to ride up or down upon the fluid 98 and O-rings 92 and 94 under the urging of spring washer 106. In this manner, the coupling system of the present invention rejects the low frequency motion caused by thermal expansion while transmitting the higher frequency motion generated by the dither suspension mechanism.

The function of the flexure stud 100 is to clamp the laser body 82 firmly against the O-rings 92 and 94. At the dither frequencies, the flexure stud 100 may twist as a torsional spring to absorb the clockwise and counterclockwise displacement, if any, between the laser mounting plate 78 and the laser body 82. Generally speaking, the viscous fluid coupling between the upper surface 90 of the plate 78 and the lower surface of the body 82 appears as solid coupling at the dithered frequencies. However, as the laser is accelerated from a rest position or decelerated to a rest position, the flexure stud 100 is called upon to twist and absorb energy which would otherwise cause a stress upon the laser body 82 and degrade the performance of the laser.

While arrangement shown in FIGS. 1 and 2 contemplates an annular coupling arrangement concentric about the major axis of the gyro, it will be understood that individual circular pads could be formed with a plurality of such pads creating circular reservoirs about the major axis for retaining the viscous fluid 98. It might be necessary to utilize such an arrangement if the laser body 82 required space about its lower surface for additional devices. Further, the flexure stud 100 could be threaded into the upper surface of the mounting plate 78 rather than extending therefrom as a solid member. Finally, it will be understood that the coupling arrangement shown between the plate 78 and laser body 82 could also be utilized between the flat washer 104 and the body 82 should that become necessary. Other modifications and variations of the coupling system will become apparent after further and careful study of the specification, drawings and appended claims.

We claim:

1. A coupling system for rejecting low frequency motion and transmitting high frequency motion about an axis comprising:

a driving member for transmitting motion about said axis;

a driven member for receiving said transmitted motion about said axis;

said driving member having a first reservoir forming surface about said axis;

said driven member having a second reservoir forming surface about said axis;

resilient means for closing said first and second surfaces to form a reservoir; and a viscous fluid located within said reservoir which, at said high frequency, appears as a solid to transmit said high frequency motion and, at said low frequency, yields to said low frequency motion.

2. A coupling system, as claimed in claim 1, wherein:

said first reservoir forming surface of said driving member is a first substantially flat upper annular surface which is substantially perpendicular to said axis and substantially concentric about said axis and has an inner and outer edge;

said second reservoir forming surface of said driven member is a second substantially flat lower annular surface which is substantially perpendicular to said axis, substantially concentric about said axis, is closely spaced axially from said first reservoir forming surface, and has inner and outer edges substantially radially aligned with said inner and outer edges of said first reservoir forming surface; and said resilient means for closing said first and second flat surfaces are two rings of resilient material aligned with said inner and outer edges of said surfaces.

3. A coupling system, as claimed in claim 2, additionally comprising:

clamping means for retaining said driven member against said first flat surface during transmission of said high frequency motion, having a longitudinal extension about said axis extending from said first surface through said second surface and said driven member; and said longitudinal extension of said clamping means having a low spring constant that allows flexure about said axis at said high frequency.

4. In a laser gyro having a laser body driven about an axis by a dither suspension mechanism through a coupling system, the coupling system comprising:

said dither suspension mechanism having a surface juxtaposed with said laser body, said laser body having a surface juxtaposed with said suspension mechanism wherein said surfaces are parallel, first and second annular grooves within one of said surfaces concentrically arranged with said axis, resilient ring means mounted within said first and second annular grooves to form a reservoir defined by said parallel surfaces and said resilient ring means, and a viscous fluid within said reservoir which responds as a solid when said laser body is driven by said dither suspension mechanism and yields as said laser body and said dither suspension mechanism expand and contract due to temperature change.

5. A laser gyro coupling system as claimed in claim 4, wherein:

said parallel surfaces are flat and perpendicular to said axis, said first and second annular grooves are located within said flat surface of said dither suspension mechanism, and said flat surface of said dither suspension mechanism is spaced between said first and second annular grooves to present a flat, annular surface parallel to said flat surface of said laser body with a narrow clearance between said flat surfaces.

6. A laser gyro coupling system as claimed in claim 4, additionally comprising:

said dither suspension mechanism having an axial extension extending from said flat surface of said dither suspension mechanism along said axis and through said laser body, clamping means attached to said axial extension of said dither suspension mechanism for retaining said laser body against said dither suspension mechanism and said coupling system, and said axial extension having a low spring constant about said axis whereby said axial extension twists as said dither suspension mechanism drives said laser body.

7. A laser gyro coupling system as claimed in claim 6, additionally comprising:

spring means extension where said extension passes through said laser body, for absorbing thermal expansion of said laser gyro components parallel to said axis, mounted about said axial extension where said extension passes through said laser body, thermal expansion of said laser gyro components perpendicular to said axis being absorbed by said resilient ring means.

* * * * *